United States Patent [19]

DuBrow et al.

[11] 3,929,088
[45] Dec. 30, 1975

[54] USE OF WATER-IN-OIL EMULSIONS OF WATER SOLUBLE VINYL ADDITION POLYMERS TO IMPROVE THE EFFICIENCY OF JET POWERED SHIPS

[75] Inventors: Paul L. DuBrow, Chicago; Alvin J. Frisque, La Grange, both of Ill.

[73] Assignee: Nalco Chemical Company, Oak Brook, Ill.

[22] Filed: July 11, 1974

[21] Appl. No.: 487,524

[52] U.S. Cl................... 115/14; 114/67 R; 137/13
[51] Int. Cl.²................... B63H 11/02; F17D 1/16
[58] Field of Search .... 115/11, 14; 114/67 R, 67 A; 260/29.6 H; 137/13

[56] References Cited
UNITED STATES PATENTS

| | | | |
|---|---|---|---|
| 2,461,797 | 2/1949 | Zwicky | 115/14 |
| 3,102,548 | 9/1963 | Smith et al. | 114/67 A |
| 3,303,811 | 2/1967 | Giles | 114/67 R |
| 3,516,376 | 6/1970 | Kowalski | 114/67 R |
| 3,628,488 | 12/1971 | Gibson | 114/67 A |
| 3,734,873 | 5/1973 | Anderson et al. | 260/29.6 H |
| 3,811,398 | 5/1974 | Burgin | 115/14 |
| 3,820,714 | 6/1974 | Erickson et al. | 137/13 |

*Primary Examiner*—Trygve M. Blix
*Assistant Examiner*—Charles E. Frankfort
*Attorney, Agent, or Firm*—John G. Premo; Robert A. Miller; Barry W. Sufrin

[57] ABSTRACT

A method for improving the operating efficiency of an aqueous jet propelled ship by the introduction of a water-in-oil emulsion of a finely divided water soluble vinyl addition polymer into the water stream that propels the ship is described. The polymer so added improved the cohesive character of the water stream by eliminating tangential flow through the nozzles while also improving the water stream's turbulence reduction properties within the propulsion system.

4 Claims, 1 Drawing Figure

U.S. Patent    Dec. 30, 1975    3,929,088
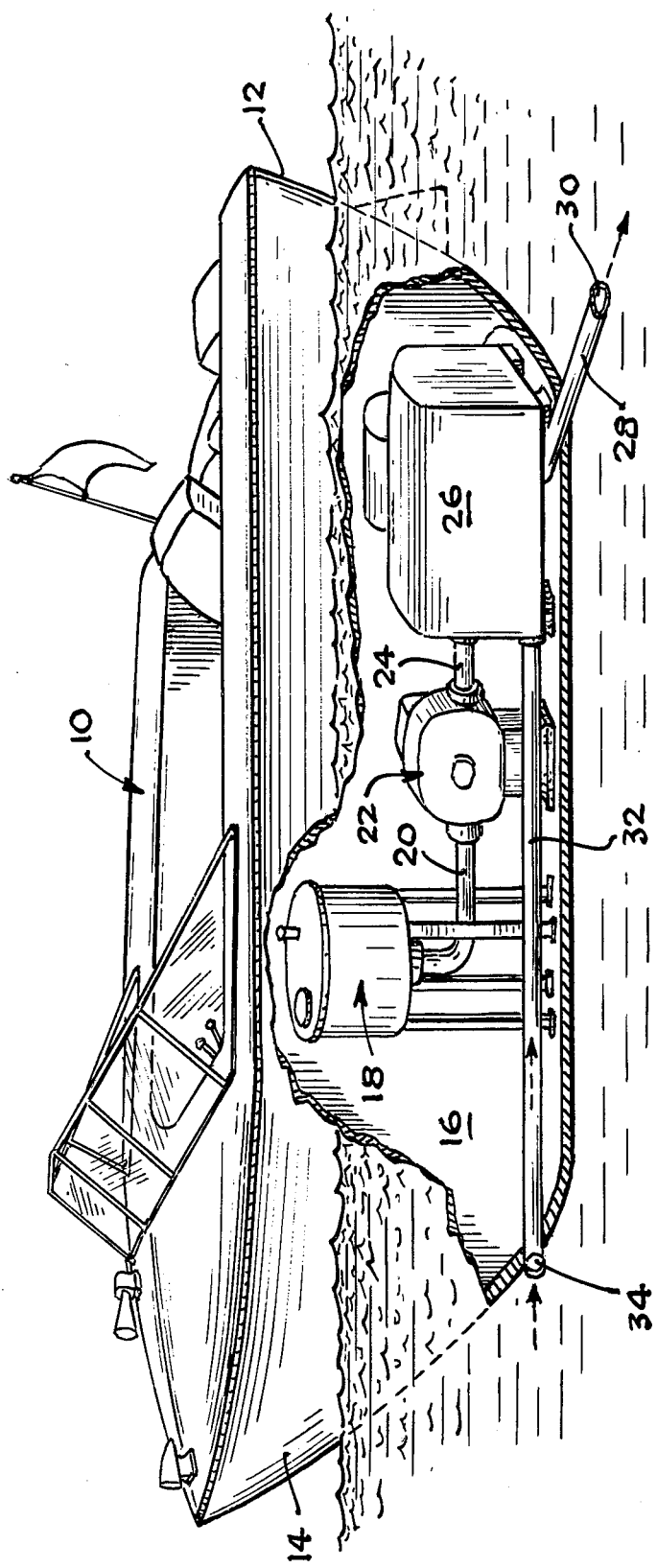

USE OF WATER-IN-OIL EMULSIONS OF WATER SOLUBLE VINYL ADDITION POLYMERS TO IMPROVE THE EFFICIENCY OF JET POWERED SHIPS

INTRODUCTION

This invention relates to a method for increasing the speed and efficiency of jet boats through the use of a water-in-oil emulsion of a finely divided water soluble vinyl addition polymer which is introduced into the jet to give the jet more coherent properties.

The desire for faster and more efficient means of water transportation has existed for many years. Recently, the use of high pressure jets of water to propel ships has become an important lead in this quest. This type of propulsion operates when a high pressure stream of water is pumped outward from the bottom and stern of the ship below the normal water level much in the same way a jet of hot air is used to power conventional jet aircraft. Unfortunately, in the use of aqueous jets to power ships a great deal of energy has heretofore been lost due to the fact that part of the stream splits off tangentially, that is 90° to the direction of motion. That portion of the stream that is not at 180° to the forward motion of the ship results in a waste of energy. It has now been found that the application of high molecular weight water soluble polymers to the water jet results in a more coherent stream, i.e., most of the water is flowing at 180° to the forward motion of the vessel. Also, the addition of even small amounts of water soluble polymers described herein, will reduce turbulence (drag) allowing more water through the given propulsion system and higher pressures to attained in the same system. In order to further make this practical, polymers used must be of sufficiently high concentration so as not to cause added excess weight in the hold of the ship so that the energy savings attained by the use of the polymer in forming the coherent stream is lost through the excess weight. Water soluble vinyl addition polymers have heretofore been made available commercially either in solid form, or in very dilute aqueous form. The solid form is impractical for addition to the aqueous jet in jet boats in that a long dissolution time is needed, and equipment such as mixing tanks would have to be provided on the ship to dissolve the polymer. Dilute solutions of the water soluble polymer are inconvenient also, due to the amount of water which is included in the polymer. We have now found that concentrated water-in-oil emulsions of finely divided vinyl addition polymers which are capable of rapidly inverting through the action of shear, surfactants, or other means can be adapted for use in aqueous jet propulsion systems.

OBJECTS

An object of our invention is to provide a method by which water-in-oil emulsions of a finely divided vinyl addition polymer can be used in aqueous jet propulsion systems so as to increase the cohesiveness and improve turbulence reduction properties of a jet of water being forced outward with a resultant gain of efficiency in the jet. Another object of our invention is to provide a more efficient aqueous jet propulsion system through the use of a water-in-oil emulsion of a finely divided water soluble vinyl addition polymer which is added to the water stream before it leaves the ship so as to render the stream more cohesive and to impart to the stream improved turbulence reduction properties with a resulting increase in efficiency of the jet propulsion system. Other objects will appear hereinafter.

THE INVENTION

With respect to the drawing there is shown a horizontal side view, cut away in part, of a ship, commonly referred to as a speed boat. The speed boat is generally designated by the numeral 10. It is of conventional design having a stern 12 and bow 14. Positioned within the hold 16 of the speed boat 10 is a reservoir 18 adapted to contain a supply of latex polymer. Fitted at the bottom of the reservoir is a line 20 which is adapted to conduct the latex polymer from reservoir into a metering pump 22. From the metering pump 22 the latex polymer is conducted through line 24 into a high pressure pump 26. Thence it is discharged through discharge line 28 into jet orifice 30.

The high pressure pump 26 is additionally fitted with a water intake line 32 the end of which is in communication with the water in which the boat rides by means of water inlet 34. Both the metering pump 22 and high pressure $p$ 26 are powered by a conventional internal combustion engine, not shown.

In operation, liquid polymer is proportioned by metering pump 22 from reservoir 18 through line 24 and is admixed with water contained in high pressure pump 26, which water is fed to high pressure pump 26 through the water intake line 32. The latex polymer in small amounts is mixed intimately with the intake water by high pressure pump through discharge line 28 and is discharged through jet orifice 30 in the form of a cohesive high pressure jet of water. By thus metering the liquid latex polymer and mixing it with the intake water at the high pressure pump the aqueous jet discharged through the jet orifice is in the form of a discharge pattern which allows the speed boat to operate at higher speeds and more efficiently.

The metering pump should be designed so that from 0.003 to 10% by weight polymer is present in water being discharged through the high pressure pump 26. While only one jet orifice 30 is shown in the drawing, it is intended within the scope of my invention that one or more jet orifices can be used.

The high pressure pump 26 may be driven by any conventional means such as diesel, dieselelectric, internal combustion engines or the like. It should be designed for the specific ship on which it is intended to operate, and should provide a stream of water at a sufficient pressure so as to propel the ship forward. The pressure of the stream of the water leaving the high pressure pump 26 should be in the range of 10 to 500 psi.

THE WATER-IN-OIL EMULSIONS OF FINELY DIVIDED WATER SOLUBLE VINYL ADDITION POLYMERS

The water-in-oil emulsions or lattices of finely divided, water-soluble, vinyl addition polymers useful in this invention are stable, yet at the same time contain relatively large amounts of polymer. The polymers dispersed in the emulsion are quite stable when the particle size of the polymer is in the range of 2 millimicrons up to about 5 microns. the preferred particle size is within the range of 5 millimicrons and 3 microns.

The stable water-in-oil emulsion comprises: 1) an aqueous phase; 2) a hydrophobic liquid; and 3) a water-in-oil emulsion emulsifying agent.

The polymer containing emulsion of this invention is comprised of an aqueous phase ranging from between 30 and 95 per cent by weight of the emulsion. The aqueous phase is defined as the sum of the polymer or copolymer and the water present in the composition. The preferred range is between 70 and 90 per cent by weight of the emulsion. The most preferred range is between 70 and 80 per cent by weight of the emulsion.

The polymer concentration of the emulsion ranges between 10 – 50 per cent by weight. A preferred range is between 25 and 40 per cent by weight of the emulsion. The most preferred range is between 25 and 35 per cent by weight of the emulsion.

The polymer contained in the emulsion must be water-soluble. Any of the common water-soluble polymers such as polyacrylamide, polyvinylpyrrolidone, polyacrylates, etc., will increase the stream cohesion and jet efficiency.

Particularly prferred in the use of my invention are acrylamide polymers. For the purpose of this invention the term acrylamide polymer includes acrylamide homopolymers and copolymers which contain at least 20 percent and preferably 75 percent by weight of acrylamide. The acrylamide polymers most commonly used in the practice of this invention include polyacrylamide and its water-soluble copolymers prepared by polymerizing acrylamide with monomers, such as for instance acrylic acid, methylacrylic acid, and itaconic acid. Particularly useful in the practice of this invention is acrylamide, which has from 1 – 50% of the original carboxamide groups hydrolized to carboxyl groups. the molecular weights of such polymers and copolymers exceeds 500,000.

The molecular weight of the polymers described above may vary over a wide range, e.g., 10,000 to 50 million. The preferred water-soluble vinyl addition polymer has a molecular weight in excess of one million.

The organic or oil phase of the emulsion is comprised of an inert hydrophobic liquid. The hydrophobic liquid comprises between 5 and 70% by weight of the emulsion. The most preferred range is between 20 and 35 percent by weight of the emulsion.

The oils used in preparing these eulsions may be selected from a large group of organic liquids which include liquid hydrocarbons and substituted liquid hydrocarbons. A preferred group of organic liquids are aliphatic hydrocarbon liquids which include blends of aromatic and aliphatic hydrocarbon compounds, which contain from 4 to 8 carbon atoms. Thus, such organic hydrocarbon liquids as benzene, xylene, toluene, mineral oils, kerosenes, naphtha and in certain instances, petroleum, may be used. A particularly useful oil from the standpoint of its physical and chemical properties is the branch-chain isoparaffinic solvent sold by Humble Oil and Refinery Company under the trade name of "Isopar M." Typical specifications of this narrow-cut isoparaffinic solvent are set forth below in TABLE I.

TABLE I

| Specification Properties | Minimum | Maximum | Test Method |
|---|---|---|---|
| Gravity API at 60/60 °F. | 48.0 | 51.0 | ASTM D 287 |
| Color, Saybolt | 30 | — | ASTM D 156 |
| Aniline point, °F | 185 | — | ASTM D 611 |
| Sulfur, ppm | — | 10 | ASTM D 1266 (Nephelometric mod.) |
| Distillation, °F. | | | |

TABLE I-continued

| Specification Properties | Minimum | Maximum | Test Method |
|---|---|---|---|
| IBP | 400 | 410 | |
| Dry Point | — | 495 | |
| Flash point, °F. (Pensky-Martens closed cup) | 160 | — | ASTM D 93 |

Any conventional water-in-oil emulsifying agent can be used such as sorbitan monostearate, sorbitan monooleate, and the socalled low HLB materials which are all documented in the literature and summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is presented in amounts ranging between 0.1 and 5.0% by weight of the emulsion. The preferred range is between 1.0 and 3.0% by weight of the emulsion. The most preferred range is between 1.2 and 2.0% by weight of the emulsion.

The polymers contemplated for use in this invention may be synthesized in emulsion form as described in Vanderhoff et al., U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al., U.S. Pat. Nos. 3,624,019 and 3,734,873, both of which are hereby incorporated by reference.

The water-in-oil emulsions used in the practice of this invention exhibit the unique ability of rapidly dissolving into an aqueous solution. The polymer-containing emulsion releases the polymer in water in the presence of agitation or shear such as would be present in the high pressure pump as used in this invention. While shear is the preferred inversion technique, the polymer can also be inverted into the aqueous phase through use of a surfactant which may be added to the water-in-oil emulsion or latex of a finely divided water-soluble vinyl addition polymer itself, or to the water stream into which the water-in-oil emulsion or latex is added.

The preferred surfactants used for inverting the polymer are water-soluble and are further characterized as hydrophilic. The surfactants and techniques for inverting the polymer are disclosed in Anderson et al., U.S. Pat. Nos. 3,624,019 and 3,734,873.

If a surfactant is used to invert the polymer, it is usually added at from 0.01 to 50% by weight of the polymer contained in the water-in-oil emulsion. A preferred level of surfactant is between 1 and 10% by weight based on polymer.

The surfactant may be added to the water-in-oil emulsion to render it "self-inverting" on contact with water, or can be added by means of a pump to the jet of water either before or after it is mixed with the water-in-oil emulsion so long as it is added before the jet is discharged.

Regardless of the technique employed for inversion, the polymer emulsions should be checked on a case-by-case basis with the method chosen. This is due to variations in stability and the necessity to invert the polymer to the aqueous phase quickly.

The following examples are offered to illustrate my invention:

EXAMPLE 1

Acrylamide Emulsion Recipe:

| | |
|---|---|
| ISOPAR:M | 27.6 grams |
| Sorbitan Monostearate | 1.65 grams |
| Water | 40.20 grams |
| Acrylamide | 36.51 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a two liter glass reactor fitted with a stirrer, thermometer and nitrogen purge. The monomer solution was prepared by dissolving the acrylamide in water. The pH of the monomer solution was adjusted to 8.5 with sodium hydroxide. The monomer solution was adjusted to 8.5 with sodium hydroxide. The monomer solution was added to the organic phase with rapid agitation. The reactor was purged for 30 minutes after which time the 2,2'azobis (isobutyronitrile) dissolved in acetone was added to the mixture. The emulsion was heated at 60°C. with agitation. The reaction proceeded for 2-½ hours at which time it had reached completion. The resulting product was a stable emulsion.

EXAMPLE 2

Acrylamide-acrylic acid emulsion recipe:

| | |
|---|---|
| ISOPAR M | 28.10 grams |
| Sorbitan Monostearate | 1.85 grams |
| Water | 40.00 grams |
| Acrylamide | 33.90 grams |
| Acrylic Acid | 2.40 grams |
| Sodium Hydroxide | 2.30 grams |
| 2,2'azobis (isobutyronitrile) | 0.07 grams |

As in Example 1, the sorbitan monostearate was dissolved in the ISOPAR M and the resulting solution was poured into a two liter glass reactor fitted with a stirrer, thermometer, and nitrogen purge. the monomer solution was prepared by dissolving the acrylamide and acrylic acid in water. The pH of the monomer solution was adjusted to 8.5 with sodium hydroxide. The monomer solution was added to the organic phase with rapid agitation. The reactor was purged for 30 minutes after which time the 2,2'axobis (isobutyronitrile) dissolved in acetone was added to the mixture. The emulsion was heated to 60°C. with agitation. The reaction proceeded for 2-½ hours at which time it had reached completion. The resulting product was a stable emulsion:

EXAMPLE 3

Acrylamide-methacrylic acid emulsion recipe:

| | |
|---|---|
| ISOPAR M | 27.6 grams |
| Sorbitan Monostearate | 1.65 grams |
| Water | 40.20 grams |
| Acrylamide | 34.51 grams |
| Methacrylic Acid | 2.31 grams |
| Sodium Hydroxide | 2.29 grams |
| 2,2'azobis (isobutyronitrile) | 0.07 grams |

The sorbitan monostearate was dissolved in the ISOPAR M and the resulting solution was poured into a two liter glass reactor fitted with a stirrer, thermometer, and nitrogen purge. The monomer solution was prepared by dissolving the acrylamide and methacrylic acid in water. The pH of the monomer solution was adjusted to 8.5 with sodium hydroxide. The monomer solution was added to the organic phase with rapid agitation. The reactor was purged for 30 minutes after which time the 2,2'axobis (isobutyronitrile) dissolved in acetone was added to the mixture. The emulsion was heated to 60°C. with agitation. The reaction proceeded for 2½ hours at which time it had reached completion. The resulting product was a stable emulsion.

This invention is further illustrated by the following examples:

EXAMPLE 4

To the "plant" of a jet boat operating substantially as shown in FIG. 1 would be added to the reservoir the latex polymer of Example 1. The metering pump would be set to deliver 0.248 pounds of the latex for every 1 gallon (8.337 pounds) of water pumped through the high pressure pump. Upon operation, the ship should be able to attain a higher speed with less fuel consumption with the use of the polymer.

EXAMPLE 5

The polymer of Example 2 would be used at a metering pump setting of 0.0248 pounds of latex for every gallon (8.337 pounds) water passing through the high pressure pump. A substantial increase in efficiency should be seen in the ship's operation.

In the above examples it is to be understood that as the latex is pumped with the water into the jet used to propel the boat, the high velocity of the water produces surface agitation to invert the latex and thereby places the polymer into water jets as a solution. In the case of certain applications it is desirable that a water-soluble surfactant be added with the latex polymer to increase the efficiency of the inversion of the latex and its subsequent dissolution.

WE claim:

1. A method for improving the operating efficiency of an aqueous jet propelled ship of the type where a high pressure jet of water is forced outward through one or more orifices below the normal water level of the ship to be propelled which improvement comprises the steps of:

A. adding to the high pressure jet of water being forced outward before it leaves the ship, a quantity of water-in-oil emulsion of a finely divided water soluble vinyl addition polymer so that the polymer is present in the high pressure jet of water at levels of from 0.003% to 10% by weight, and then, B. forcing said high pressure jet of water through said orifice to produce a high pressure jet of water with improved coherent character and turbulence reduction properties whereby said aqueous jet propelled ship is operated more efficiently.

2. The process of claim 1 wherein said water-in-oil emulsion of a finely divided water soluble vinyl addition polymer is a water-in-oil emulsion of a finely divided acrylamide polymer.

3. The process of claim 1 wherein the water-in-oil emulsion of a finely divided water soluble vinyl addition polymer contains from 0.01 to 10% by weight based on the polymer contained in said emulsion of a water soluble hydrophillic surfactant capable of inverting the polymer.

4. The process of claim 1 wherein said water-in-oil emulsion of a finely divided water soluble vinyl addition polymer is added to the high pressure jet of water by the use of a metering pump.

* * * * *